(Model.)
2 Sheets—Sheet 2.
S. D. REYNOLDS.
VEHICLE FOR TRANSPORTING LIVE STOCK.
No. 244,077. Patented July 12, 1881.
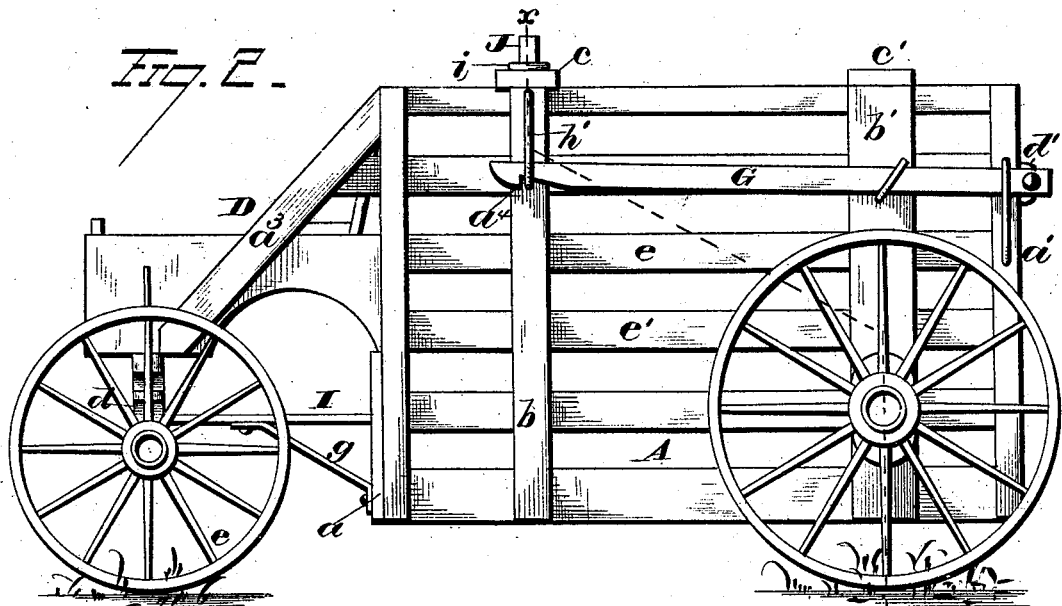
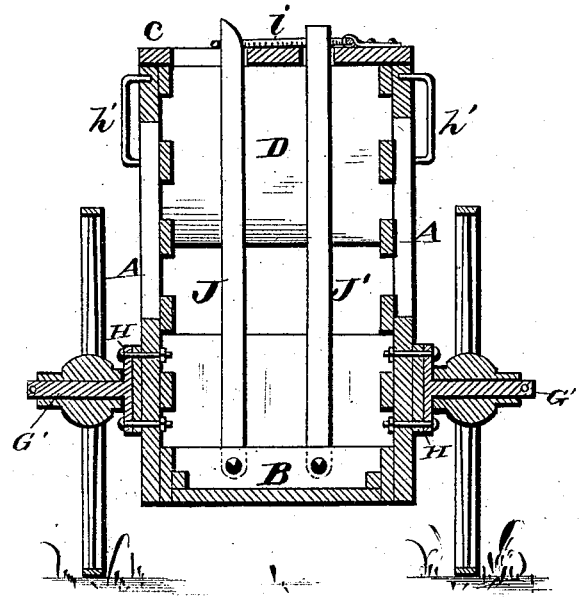
WITNESSES
INVENTOR
Samuel D. Reynolds
by Leggett and Leggett
ATTORNEYS

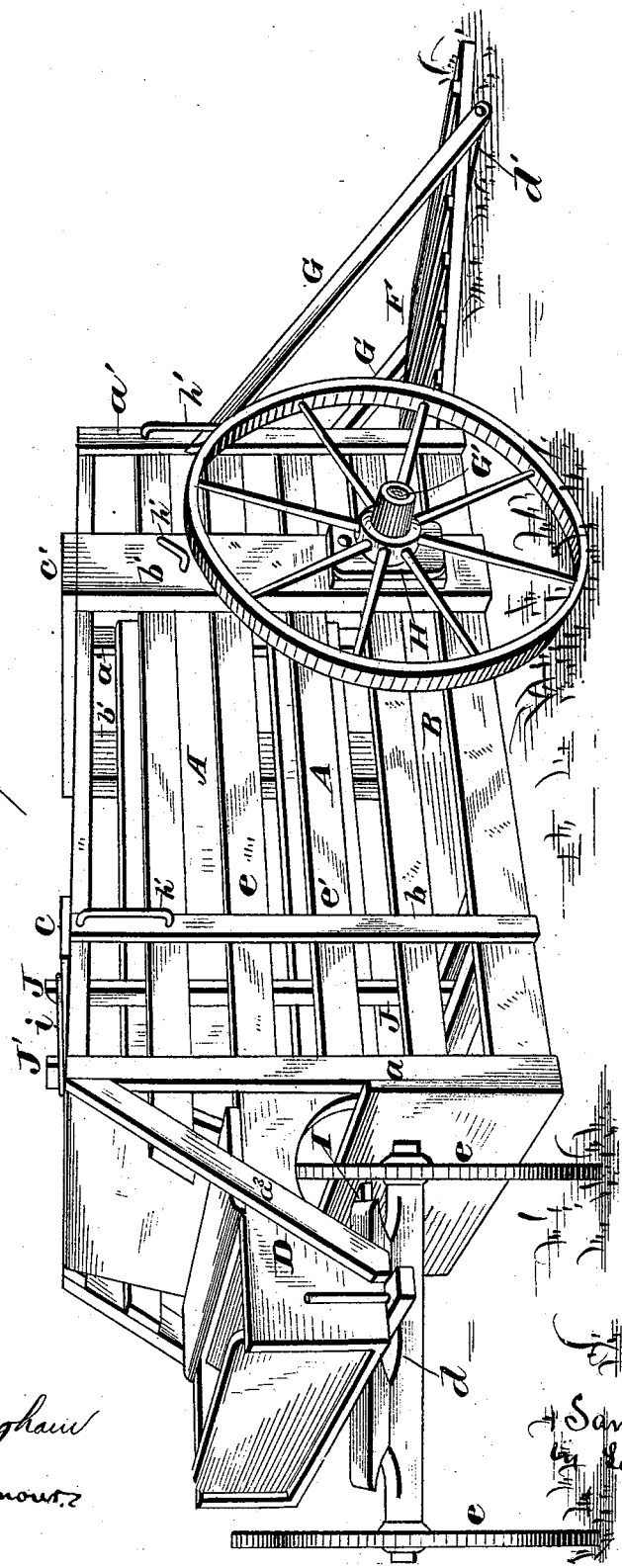

UNITED STATES PATENT OFFICE.

SAMUEL D. REYNOLDS, OF ROCHELLE, ILLINOIS.

VEHICLE FOR TRANSPORTING LIVE STOCK.

SPECIFICATION forming part of Letters Patent No. 244,077, dated July 12, 1881.

Application filed February 24, 1881. (Model.)

*To all whom it may concern:*

Be it known that I, SAMUEL D. REYNOLDS, of Rochelle, in the county of Ogle and State of Illinois, have invented a certain new and useful Improvement in Vehicles for the Transportation of Live Stock; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to an improvement in vehicles for the transportation of live stock, the object of the same being to furnish a cheap road-vehicle with efficient means of entrance thereinto and means for retaining the animals therein without injury to themselves or to the wagon.

With these ends in view my invention consists in certain details in construction and combinations of parts, as will be hereinafter more fully explained, and pointed out in the claims.

In the accompanying drawings, Figure 1 is a perspective view of my wagon with the end-gate thrown down. Fig. 2 is a side view with the gate in a closed position; and Fig. 3 is a transverse vertical section through the body, showing the manner of attaching the hind wheels.

A represents the sides of the wagon, and B the floor or bottom thereof. The sides are composed of horizontal boards of different lengths, placed suitable distances apart and secured to the end pieces, $a\ a'$. Vertical braces $b\ b'$ are secured to the opposite sides of the horizontal boards and bottom, and connected together at their upper ends by the horizontal braces $c\ c'$.

D is the driver's box, which is elevated above the floor of the wagon and rests on the front axle, $d$, said axle having the wheels $e$ journaled thereon. The sides of this box are a continuation of the horizontal boards $e'\ e'$ composing the sides of the wagon, and are strengthened by a diagonal brace, $a^3$, extending from the top of the end piece, $a$, to near the outer end of the horizontal boards $e'\ e'$, which form the sides of the box.

The end-gate F is hinged to the bottom of the wagon, and is the same height as the sides, and is adapted to be thrown back and down until the top end rests on the ground, thereby forming an easy incline, on which the animals walk in going into or out of the vehicle.

Strips of wood are fastened on the inside of the gate to afford foothold for the animals and prevent them slipping thereon. A strip of wood or metal, $d'$, is secured to the back of the gate, and has its ends projecting out beyond the sides thereof, said strip affording attachment for the locking-bars G.

The bars G are provided with notches $a^4$, adapted to engage with guides $h'$, located respectively in the vertical braces $b\ b'$, and end piece, $a'$, to hold the gate at any desired angle of inclination with the wagon.

The gate is locked in a closed position by the engagement of the notches in the end of the bars G with guards $h'$, located in any desired position in the forward portion of the vehicle. By this means it will be seen that the gate can be adjusted for cars and elevated platforms, as well as for the ground, by simply raising the locking-bars in the guides and adjusting them as desired.

The rear wheels of the wagon have bearing on two small axles, G', one being located on each side of the wagon. These axles are attached to or made integral with the axle-supporting plates H, which are attached to the vertical braces $b\ b'$ at points thereon near the bottom of the wagon. The front axle is connected to the wagon by the draft-bar I, the latter being rigidly secured to the wagon-body at one end, while the other end is perforated and adapted to enter a slot in the front axle and be retained therein by the king-bolt. A brace, $g$, assists in keeping the draft-bar in its proper position.

If desired, arrangements can be made in the interior for keeping the animals from moving about in the vehicle. One mode of accomplishing this result is by means of two upright bars, J J', placed opposite the vertical braces $b\ b'$. One of these bars, J, is pivoted at one end to the bottom of the wagon, while its other end passes up through an oblong slot formed at one side of the horizontal brace $g$, and adapted to move laterally therein, while the other upright bar, J', is rigidly attached to the bottom of the wagon and horizontal brace. A band, *i*, or any suitable fastening device is attached to the top of the horizontal brace and adapted to lock the upright bar J in a vertical position.

When it is desired to secure the animal confined in the vehicle from moving about therein the band is released from engagement with the pivotal bar J, thereby allowing it to be thrown aside to form an opening between the two bars sufficiently large to admit the head of the animal. As soon as the animal's head has passed through the opening so formed the bar J is restored and locked in a vertical position, and the animal is prevented from withdrawing its head until the pivotal bar is again thrown back.

A trough can be arranged in the front of the wagon, between the driver's seat and the upright bars J J', from which the animal can be fed during transportation.

A staple, $d^2$, is driven at the back of the driver's seat, through which a rope is passed for guiding the animal into the wagon and securing it therein.

Having fully described my invention, what I claim as new, and desire to secure by Letters Patent, is—

1. The combination, with a swinging end-gate having strips fastened to its inner surface, of the notched bars G, pivoted at one end to the end-gate, and the guides $h'$ $h'$, secured respectively to the rear and forward portions of the vehicle, substantially as set forth.

2. In a vehicle for transporting live stock, the combination, with the driver's box, the sides of which are formed by the projecting end of the horizontal boards forming the sides of the wagon, of diagonal braces connecting these side pieces with the front end pieces, and a draw-bar connecting the front axle with the front of the wagon-body immediately under the driver's seat, substantially as set forth.

In testimony that I claim the foregoing I have hereunto set my hand this 15th day of February, 1881.

SAMUEL D. REYNOLDS.

Witnesses:
J. O. McConoughy,
S. J. Smith.